US009867746B2

(12) United States Patent
Chiang

(10) Patent No.: US 9,867,746 B2
(45) Date of Patent: Jan. 16, 2018

(54) WHEELCHAIR WITH A REHABILITATION FUNCTION AND TRANSMISSION DEVICE THEREOF

(71) Applicants: Foo You Technology Co., Ltd., Taichung (TW); Kun-Yi Wu, Yunlin County (TW)

(72) Inventor: Ming-Hsiang Chiang, Taichung (TW)

(73) Assignees: Foo You Technology Co., Ltd., Taichung (TW); Kun-Yi Wu, Yunlin County (TW)

( * ) Notice: Subject to any disclaimer, the term of this patent is extended or adjusted under 35 U.S.C. 154(b) by 0 days.

(21) Appl. No.: 15/185,132

(22) Filed: Jun. 17, 2016

(65) Prior Publication Data
US 2016/0374877 A1 Dec. 29, 2016

(30) Foreign Application Priority Data
Jun. 25, 2015 (TW) .............................. 104120592 A

(51) Int. Cl.
*A61G 5/02* (2006.01)
*B62M 3/08* (2006.01)
*B62M 17/00* (2006.01)
*F16H 1/20* (2006.01)

(52) U.S. Cl.
CPC ............. *A61G 5/023* (2013.01); *A61G 5/026* (2013.01); *B62M 3/08* (2013.01); *B62M 17/00* (2013.01); *F16H 1/203* (2013.01)

(58) Field of Classification Search
CPC ....... A61G 5/023; A61G 5/026; B62M 17/00; B62M 3/08
See application file for complete search history.

(56) References Cited

U.S. PATENT DOCUMENTS

| | | | | |
|---|---|---|---|---|
| 5,632,499 A | * | 5/1997 | Hutcherson | A61G 5/023 280/246 |
| 6,113,117 A | * | 9/2000 | Mimura | A61G 5/023 280/250.1 |
| 9,398,988 B1 | * | 7/2016 | DeMirza | A61G 5/025 |
| 2002/0101054 A1 | * | 8/2002 | James | A61G 5/023 280/250.1 |
| 2007/0145711 A1 | * | 6/2007 | Mulhern | A61G 5/043 280/304.1 |

(Continued)

*Primary Examiner* — Kevin Hurley
*Assistant Examiner* — Gabriela C Craciun
(74) *Attorney, Agent, or Firm* — Alan D. Kamrath; Kamrath IP Lawfirm, P.A.

(57) ABSTRACT

A transmission device for a wheelchair with a rehabilitation function includes a first transmission shaft, a second transmission shaft coaxial to the first transmission shaft, and a sliding member. The first transmission shaft includes a first engaging portion. The second transmission shaft includes a driving section. The sliding member is mounted around the driving section to permit synchronous rotation. The sliding member has a second engaging portion and is slideable between a transmission position in which the second engaging portion engages with the first engaging portion and a release position in which the second engaging portion disengages from the first engaging portion. A wheelchair includes two transmission devices associated with two rear wheels and two footrests. The footrests can be actuated when the rear wheels move.

10 Claims, 13 Drawing Sheets

(56) References Cited

U.S. PATENT DOCUMENTS

| | | | |
|---|---|---|---|
| 2008/0246246 A1* | 10/2008 | Dix | A61G 5/023 280/233 |
| 2011/0121535 A1* | 5/2011 | Fremgen | A61G 5/023 280/250.1 |
| 2015/0141212 A1* | 5/2015 | Wu | A61G 5/12 482/80 |
| 2015/0190292 A1* | 7/2015 | Robins | A61G 5/125 180/366 |
| 2016/0058636 A1* | 3/2016 | Chang | A61G 5/023 280/230 |
| 2016/0101005 A1* | 4/2016 | Golden, Jr. | B62B 5/025 |

* cited by examiner

WHEELCHAIR WITH A REHABILITATION FUNCTION AND TRANSMISSION DEVICE THEREOF

BACKGROUND OF THE INVENTION

The present invention relates to a transmission device for a wheelchair and, more particularly, to a transmission device for a wheelchair with a rehabilitation function.

A conventional chair capable of providing a rehabilitation function by using footrests for a patient to pedal generally uses a chain for transmission purposes. The chain requires lubrication by oil. During use of the wheelchair, if the clothes of a user of the wheelchair are close to the chain, the clothes could be soiled by the oil or even get caught by the chain, which is very dangerous.

BRIEF SUMMARY OF THE INVENTION

A wheelchair with a rehabilitation function according to the present invention includes a chair having a frame, two rear wheels, and two footrests. The two rear wheels are located on a rear end of the frame and are respectively located on two sides of the frame in a horizontal direction. The two footrests are located on a front end of the frame and are respectively located on two sides of the frame in the horizontal direction. Two transmission devices are connected to the frame and are associated with the two rear wheels and the two footrests. Each of the two transmission devices includes a housing, a driving shaft, a first transmission shaft, a second transmission shaft, a driven shaft, and a sliding member.

The driving shaft is mounted in the housing and is rotatable relative to the housing about a first axis. The driving shaft includes an end connected to one of the two rear wheels to permit synchronous rotation.

The first transmission shaft is mounted in the housing and is driven by the driving shaft to rotate relative to the housing about a second axis intersecting with the first axis. An end of the first transmission shaft opposite to the driving shaft includes a first reference face. The first transmission shaft includes a first engaging portion on the first reference face. The first engaging portion has non-circular cross sections perpendicular to the second axis.

The second transmission shaft is mounted in the housing and is rotatable relative to the housing about the second axis. The second transmission shaft is mounted to the end of the first transmission shaft opposite to the driving shaft. An end of the second transmission shaft adjacent to the first transmission shaft has a driving section.

The driven shaft is mounted in the housing and is driven by the second transmission shaft to rotate relative to the housing about a third axis parallel to the first axis and intersecting with the second axis. The driven shaft has an end connected to one of the footrests to permit synchronous rotation.

The sliding member is mounted around an outer periphery of the driving section to permit synchronous rotation. An end of the sliding member adjacent to the first transmission shaft includes a second engaging portion having non-circular cross sections perpendicular to the second axis. The second engaging portion removably engages with the first engaging portion. The sliding member is slideable along the second axis relative to the second transmission shaft between a transmission position and a release position. When the sliding member is in the transmission position, the second engaging portion engages with the first engaging portion, and the first transmission shaft and the sliding member rotate synchronously. When the sliding member is in the release position, the second engaging portion disengages from the first engaging portion, and the sliding member is not driven when the first transmission shaft rotates.

The present invention will become clearer in light of the following detailed description of illustrative embodiments of this invention described in connection with the drawings.

DETAILED DESCRIPTION OF THE INVENTION

Figure 1:
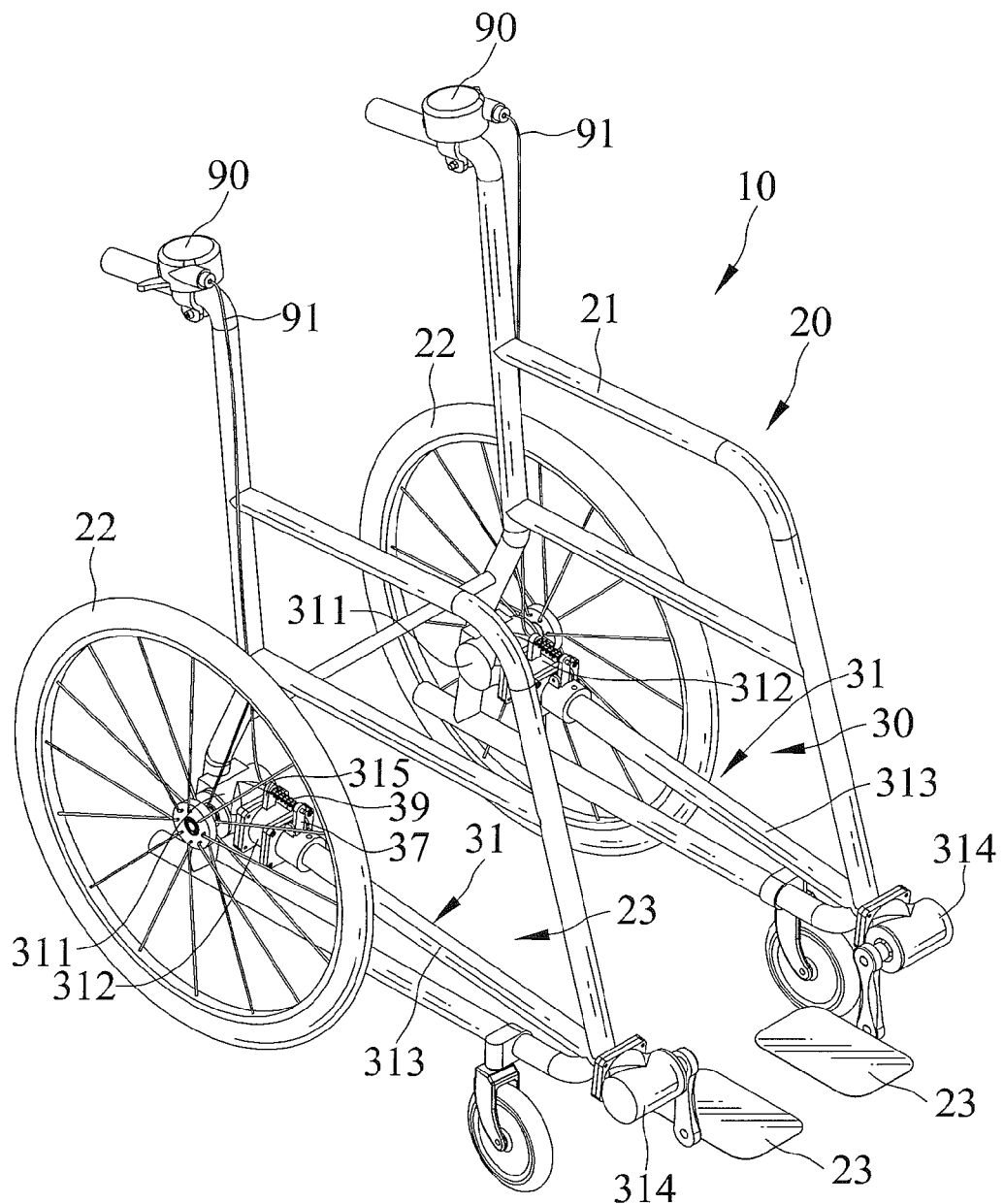
FIG. 1 is a perspective view of a wheelchair according to the present invention.
Figure 2:
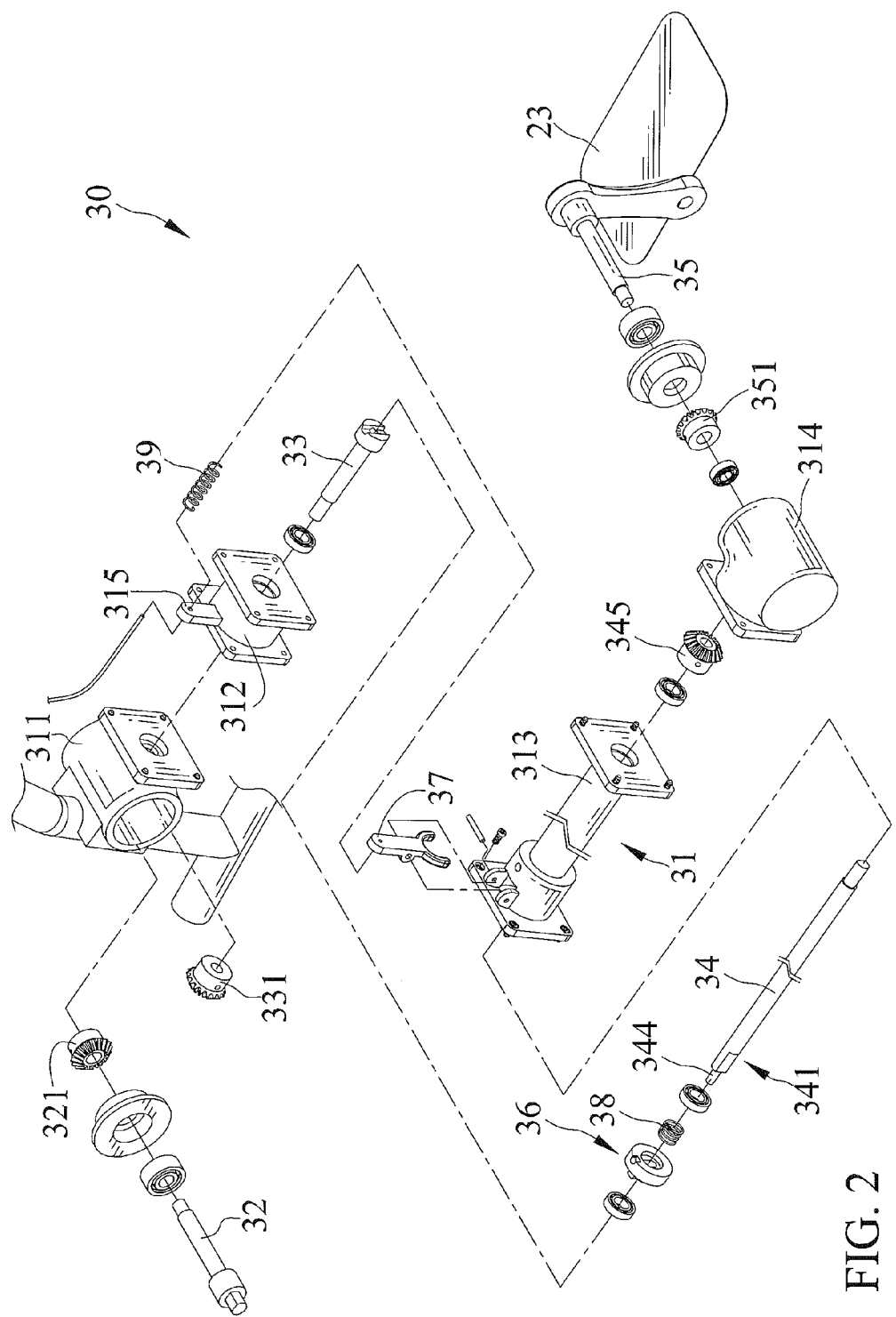
FIG. 2 is an exploded, perspective view of a transmission device of the wheelchair of FIG. 1.
Figure 3:
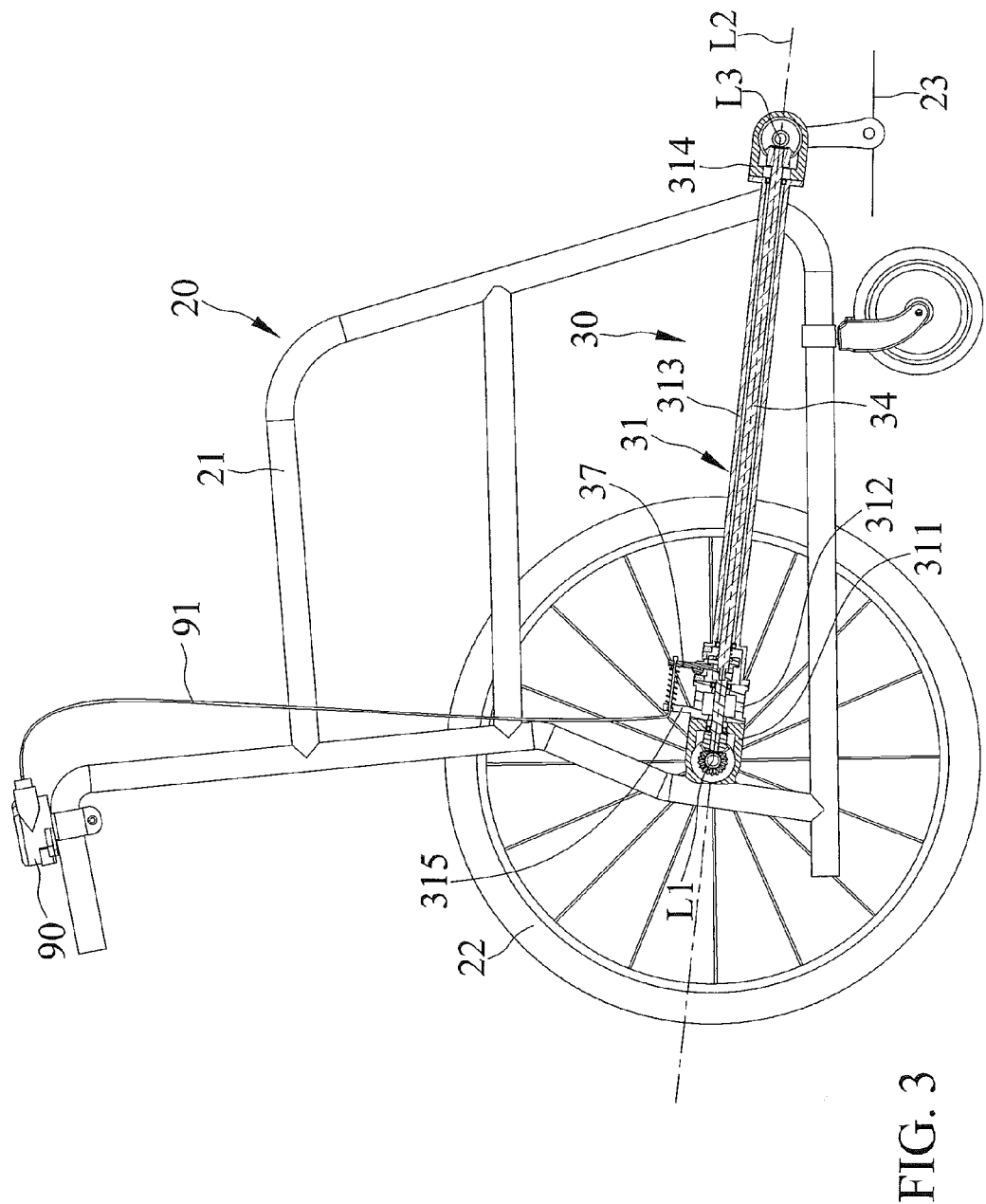
FIG. 3 is a partly cross-sectioned side view of the wheelchair of FIG. 1.
Figure 4:
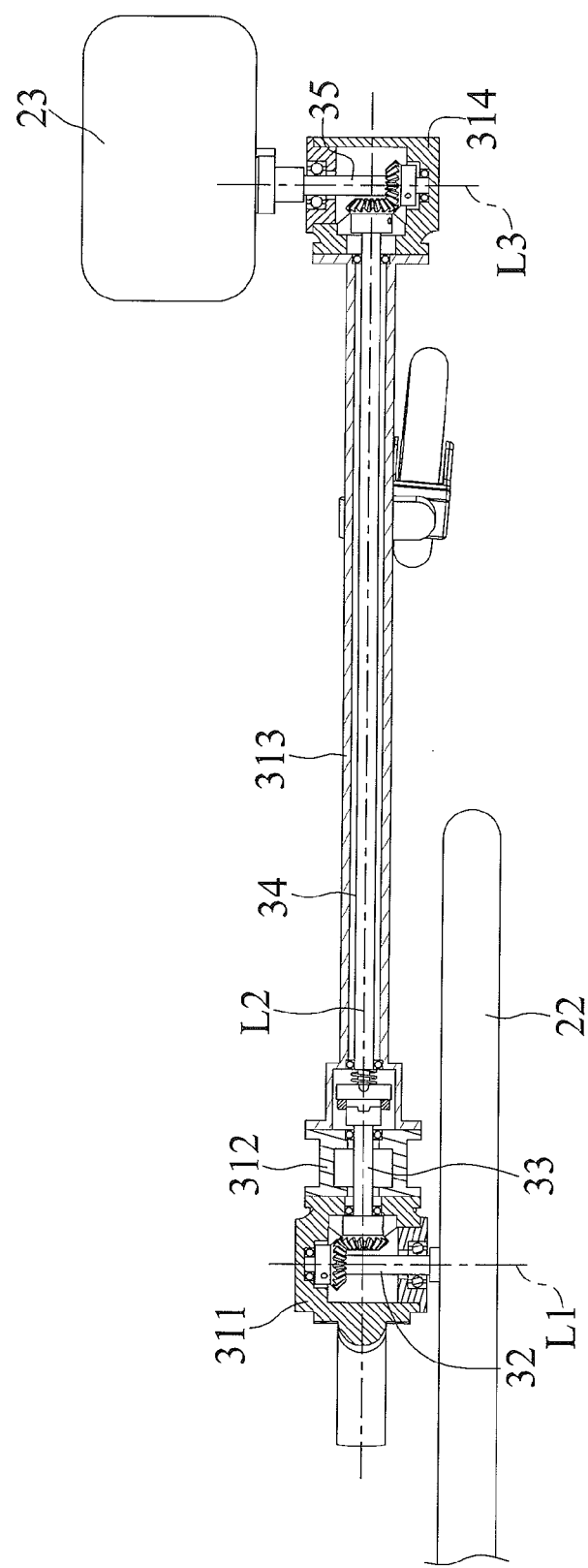
FIG. 4 is a partly cross-sectioned view of a portion of the wheelchair of FIG. 1.
Figure 5:
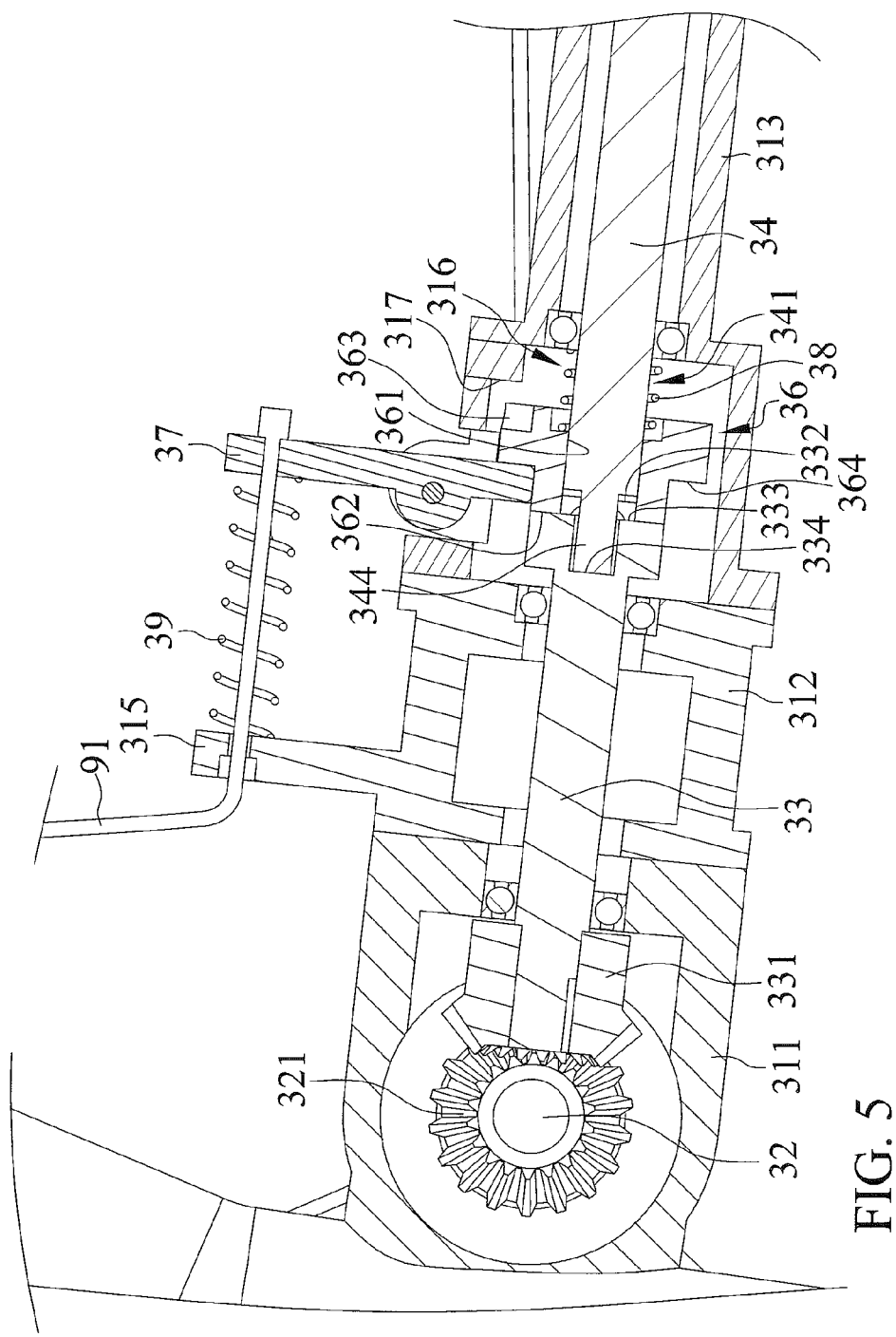
FIG. 5 is a partial, enlarged cross sectional view of the transmission device.
Figure 6:
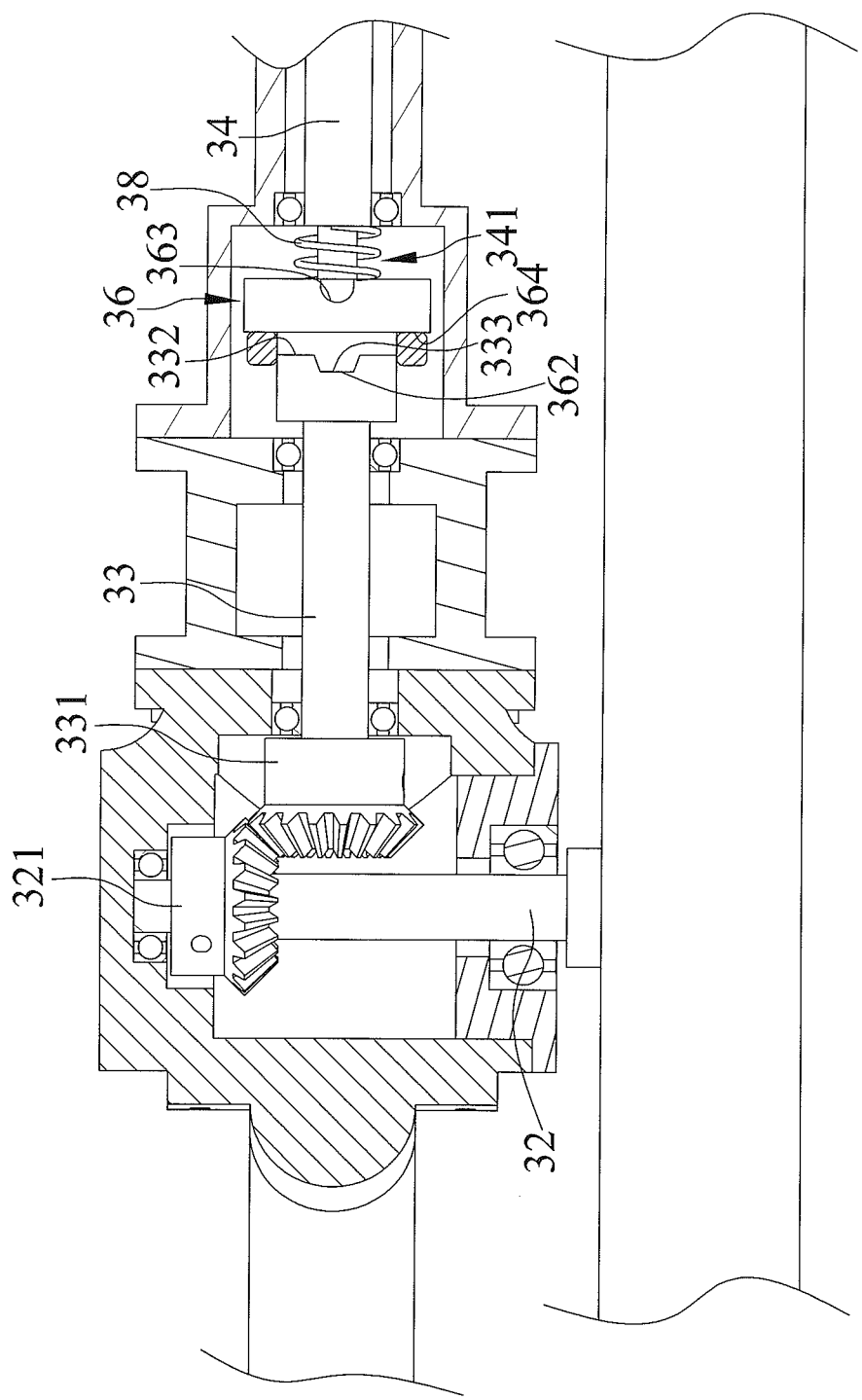
FIG. 6 is another partial, enlarged cross sectional view of the transmission device.

With reference to FIG. 1, a wheelchair 10 with a rehabilitation function according to the present invention includes a chair 20 and two transmission devices 30. The chair 20 includes a frame 21, two rear wheels 22, and two footrests 23. The rear wheels 22 are located on a rear end of the frame 21 and are respectively located on two sides of the frame 21 in a horizontal direction. The footrests 23 are located on a front end of the frame 21 and are respectively located on two sides of the frame 21 in the horizontal direction.

With reference to FIGS. 2-6, the transmission devices 30 are connected to the frame 21 and are located between the two rear wheels 22. The two transmission devices 30 are respectively associated with the two rear wheels 22 and the two footrests 23.

Each transmission device 30 includes a housing 31, a driving shaft 32, a first transmission shaft 33, a second transmission shaft 34, and a driven shaft 35. The housing 31 is a substantially Z-shaped hollow rod and includes a first portion 311, a second portion 312, a third portion 313, and a fourth portion 314. The second portion 312 is connected to the first portion 311. A protrusion 315 is formed on an outer surface of the second portion 312. The third portion 313 is connected to a side of the second portion 312 opposite to the first portion 311. A side of the third portion 313 adjacent to the second portion 312 includes a stepped compartment 316.

The stepped compartment 316 has a bottom face facing the second portion 312 and includes an engaging projection 317 protruding from the bottom face. The fourth portion 314 is connected to a side of the third portion 313 opposite to the second portion 312.

The driving shaft 32 is mounted in the first portion 311 of the housing 31 and is rotatable relative to the housing 31 about a first axis L1. The driving shaft 32 extends along the first axis L1. An end of the driving shaft 32 is connected to one of the rear wheels 22 to permit synchronous rotation. A first bevel gear 321 is mounted to the other end of the driving shaft 32 opposite to the rear wheel 22 to permit synchronous rotation. The driving shaft 32 is substantially cylindrical.

The first transmission shaft 33 is mounted in the second portion 312 of the housing 31 and is driven by the driving shaft 32 to rotate about a second axis L2. An end of the first transmission shaft 33 adjacent to the driving shaft 32 is located in the first portion 311. The other end of the first transmission shaft 33 opposite to the driving shaft 32 extends beyond the second portion 312. The second axis L2 is orthogonal to the first axis L1. In this embodiment, the first and second axes L1 and L2 are perpendicular to each other. The first transmission shaft 33 extends along the second axis L2 A second bevel gear 331 is mounted to the end of the first transmission shaft 33 adjacent to the driving shaft 32 to permit synchronous rotation. The second bevel gear 331 meshes with the first bevel gear 321.

The end of the first transmission shaft 33 opposite to the driving shaft 32 includes a first reference face 332. The first transmission shaft 33 includes a first engaging portion 333 on the first reference face 332. The first engaging portion 333 is in the form of a groove and extends from the first reference face 332 towards the driving shaft 32 along the second axis L2. The first engaging portion 333 has non-circular cross sections perpendicular to the second axis L2. In this embodiment, the first engaging portion 333 extends through two sides of the first transmission shaft 33 in a diametric direction perpendicular to the second axis L2.

The end of the first transmission shaft 33 opposite to the driving shaft 32 includes a positioning groove 334. The positioning groove 334 is located in a center of the first transmission shaft 33 and extends towards the driving shaft 32 along the second axis L2. The positioning groove 334 has circular cross sections perpendicular to the second axis L2. In this embodiment, the positioning groove 334 is recessed in a side of the first engaging portion 333 adjacent to the driving shaft 32, and the first transmission shaft 33 is cylindrical.

Figure 7:
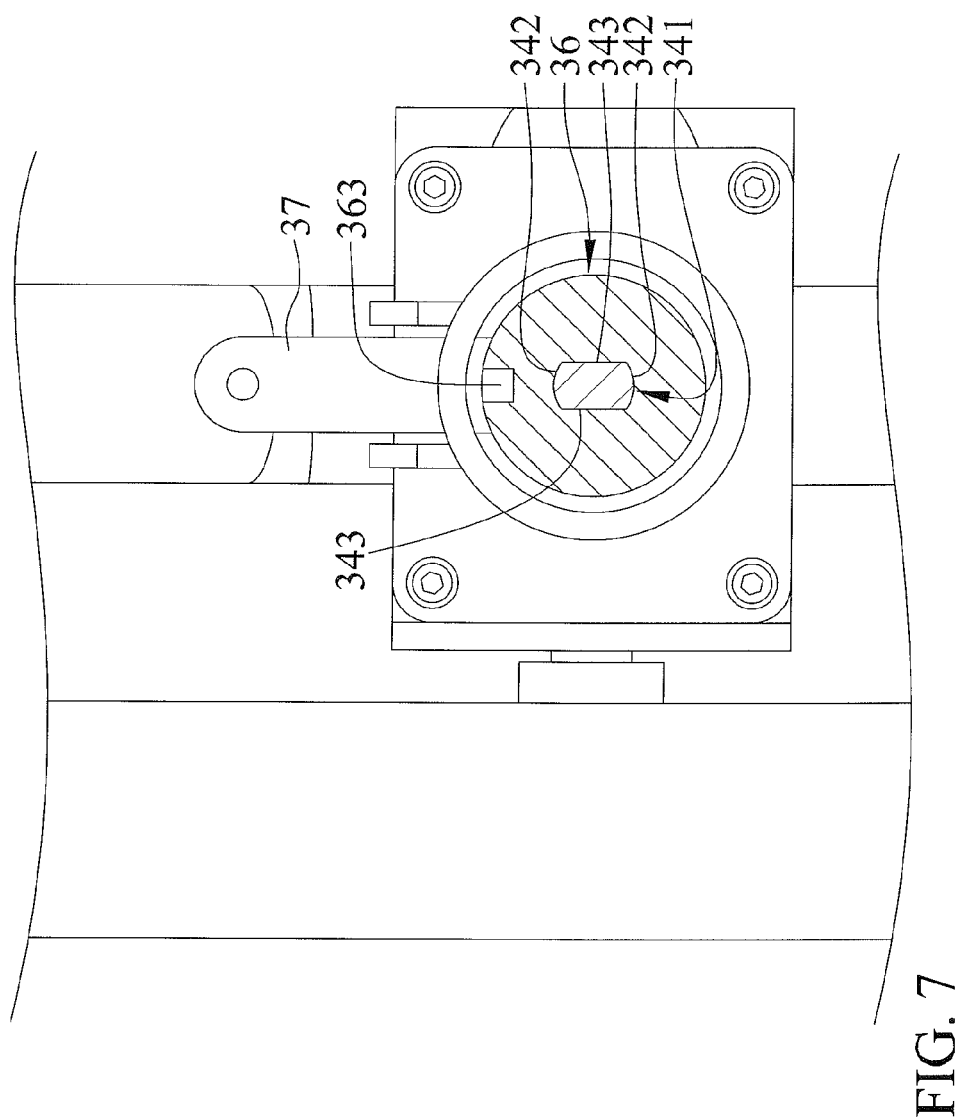
FIG. 7 is a partial, enlarged view illustrating a driving section of the transmission device.

With reference to FIG. 7, the second transmission shaft 34 is mounted in the third portion 313 of the housing 31 and is rotatable relative to the housing 31 about the second axis L2. The second transmission shaft 34 extends along the second axis L2. The second transmission shaft 34 is mounted to the end of the first transmission shaft 33 opposite to the driving shaft 32. An end of the second transmission shaft 34 adjacent to the first transmission shaft 33 has a driving section 341. The driving section 341 has non-circular cross sections perpendicular to the second axis L2. The driving section 341 of the second transmission shaft 34 is not in contact with the first transmission shaft 33. The driving section 341 includes an outer periphery having two arcuate faces 342 and two plan faces 343. The two arcuate faces 342 are diametrically opposed to each other and have an equal spacing to the second axis L2. Each plan face 343 is connected between the two arcuate faces 342. The two plan faces 343 are opposite and parallel to each other.

The end of the second transmission shaft 34 adjacent to the first transmission shaft 33 has a positioning section 344. The positioning section 344 is located in the center of the second transmission shaft 34 and is located adjacent to a side of the driving section 341 adjacent to the first transmission shaft 33. The driving section 341 has circular cross sections perpendicular to the second axis L2. The positioning section 344 of the second transmission shaft 34 is inserted into the positioning groove 334 of the first transmission shaft 33. A third bevel gear 345 is mounted to the end of the second transmission shaft 34 opposite to the first transmission shaft 33 to permit synchronous rotation.

The driven shaft 35 is mounted in the fourth portion 314 of the housing 31 and is rotatable relative to the housing 31 about a third axis L3. The third axis L3 is parallel to the first axis L1 and is orthogonal to the second axis L2. In this embodiment, the second and third axes L2 and L3 are perpendicular to each other, and the first and third axes L1 and L3 are on the same plane. The driven shaft 35 extends along the third axis L3. An end of the driven shaft 35 is connected to one of the footrests 23 to permit synchronous rotation. A fourth bevel gear 351 is mounted to the other end of the driven shaft 35 opposite to the footrest 23 to permit synchronous rotation. The fourth bevel gear 351 meshes with the third gear 345. The driven shaft 35 is cylindrical.

Each transmission device 30 further includes a sliding member 36, an operating rod 37, an elastic element 38, and a spring 39. The sliding member 36 is mounted to an outer periphery of the second transmission shaft 34 to permit synchronous rotation. The sliding member 36 is received in the stepped compartment 316. The sliding member 36 is slideable along the second axis L2 relative to the second transmission shaft 34 between a transmission position, a release position, and a locking position. The sliding member 36 includes an insertion hole 361 extending along the second axis L2. The insertion hole 361 has non-circular cross sections perpendicular to the second axis L2 and corresponding to the cross sections of the driving section 341. The driving section 341 is inserted into the insertion hole 361.

An end of the sliding member 36 adjacent to the first transmission shaft 33 has a second engaging portion 362. The second engaging portion 362 is in the form of a protrusion and extends towards the first transmission shaft 33 along the second axis L2. The second engaging portion 362 has non-circular cross sections perpendicular to the second axis L2. In this embodiment, the second engaging portion 362 extends in a diametric direction perpendicular to the second axis L2 to two sides of the second transmission shaft 34. The second engaging portion 362 is removably engaged with the first engaging portion 333.

An end of the sliding member 36 opposite to the first transmission shaft 33 includes an engaging groove 363. The engaging groove 363 extends towards the first transmission shaft 33 along the second axis L2. An outer periphery of the sliding member 36 is stepped and includes an abutment face 364 extending in a radial direction perpendicular to the second axis L2. The abutment face 364 faces the first transmission shaft 33.

An intermediate portion between two ends of the operating rod 37 is pivotably connected to the third portion 313 of the housing 31. One of the two ends of the operating rod 37 is mounted in the compartment 316 of the housing 31. The other end of the operating rod 37 extends beyond the housing 31. The end of the operating rod 37 in the house 31 abuts the abutment face 364 of the sliding member 36. The end of the operating rod 37 adjacent to the sliding member 36 is U-shaped and is seated on two sides of the sliding member 36 diametrically opposite to each other. The end of the operating rod 37 opposite to the sliding member 36 is aligned with the protrusion 315.

The elastic element 38 is mounted around the second transmission shaft 34. An end of the elastic element 38 abuts the end of the sliding member 36 opposite to the first transmission shaft 33. The other end of the elastic element 38 abuts the housing 31. The elastic element 38 biases the sliding member 36 towards the first transmission shaft 33. Two ends of the spring 39 abut the protrusion 315 and the operating rod 37.

Figure 8:
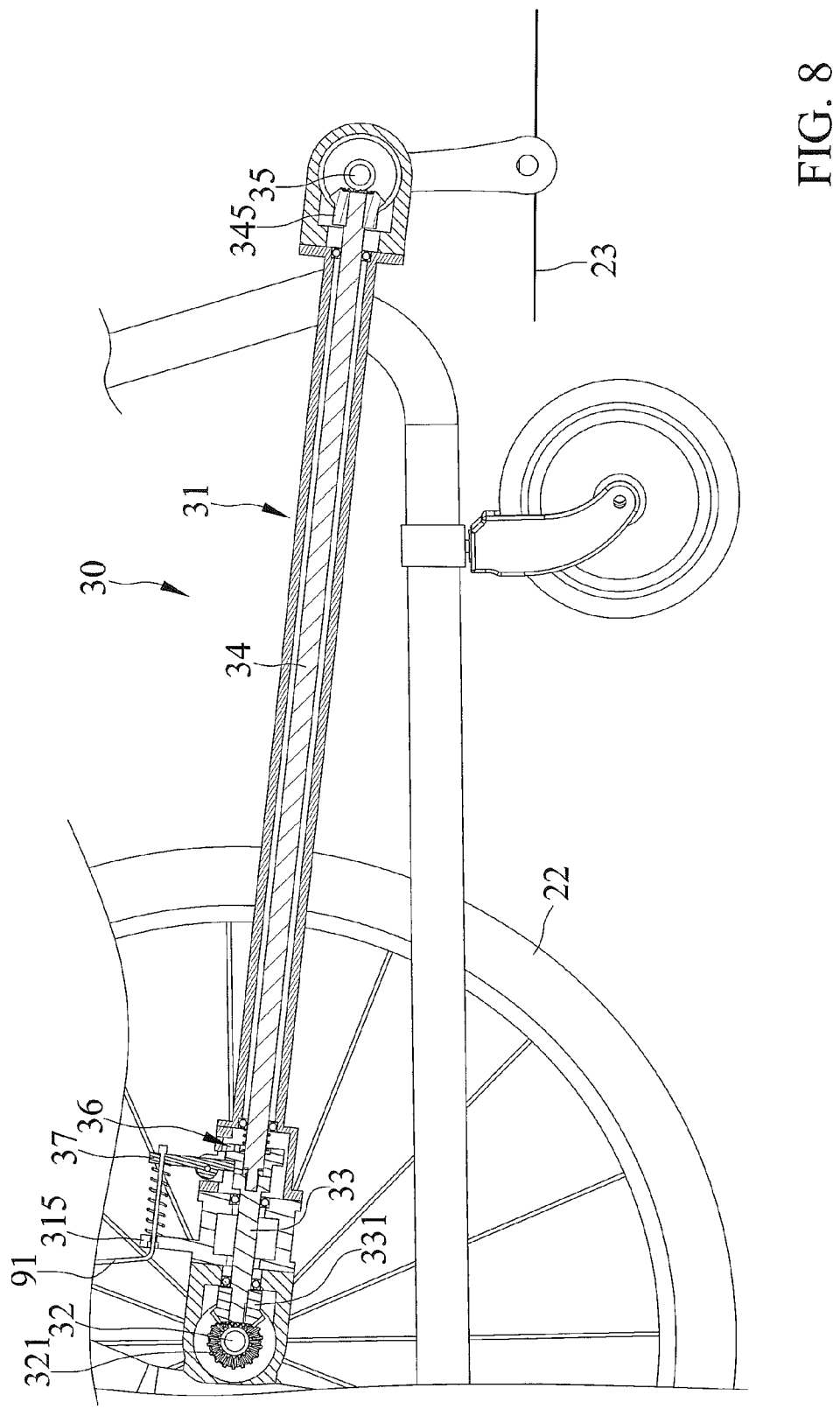
FIG. 8 is a partly cross-sectioned view of a portion of the wheelchair, with a sliding member in a transmission position.
Figure 9:
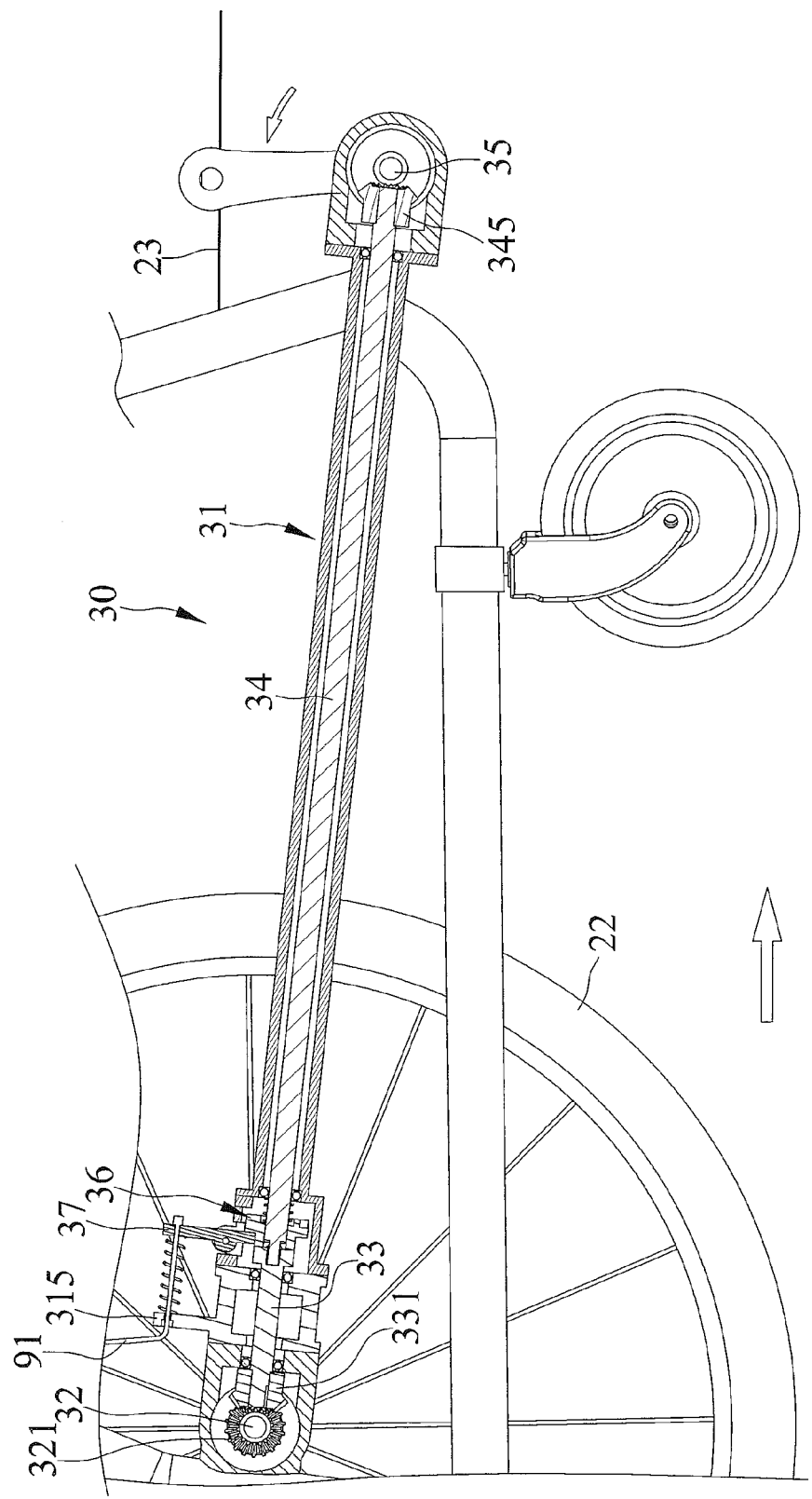
FIG. 9 is a view similar to FIG. 8, with a footrest moved.

FIGS. 8 and 9 show the sliding member 36 in the transmission position. When a care taker intends to change the position of the sliding member 36, a controller 90 is operated to pull a cable 91 to actuate the operating rod 37, which, in turn, pushes and, thus, moves the sliding member 36. When the pulling force of the cable 91 is released, the operating rod 37 is moved back to its original position under the action of the spring 39, and the sliding member 36 is pushed back to the transmission position.

When the sliding member 36 is in the transmission position, the second engaging portion 362 engages with the first engaging portion 333, and the first transmission shaft 33 and the sliding member 36 rotate synchronously. When the care taker pushes the chair 20 and, thus, rotates the rear wheels 22, the footrests 23 are driven by the driven shafts 35 to rotate relative to the chair 20. Since the feet of the sitter rest on the footrests 23, the footrests 23 can carry the feet and the legs of the sitter to move, achieving a rehabilitation effect.

Figure 10:
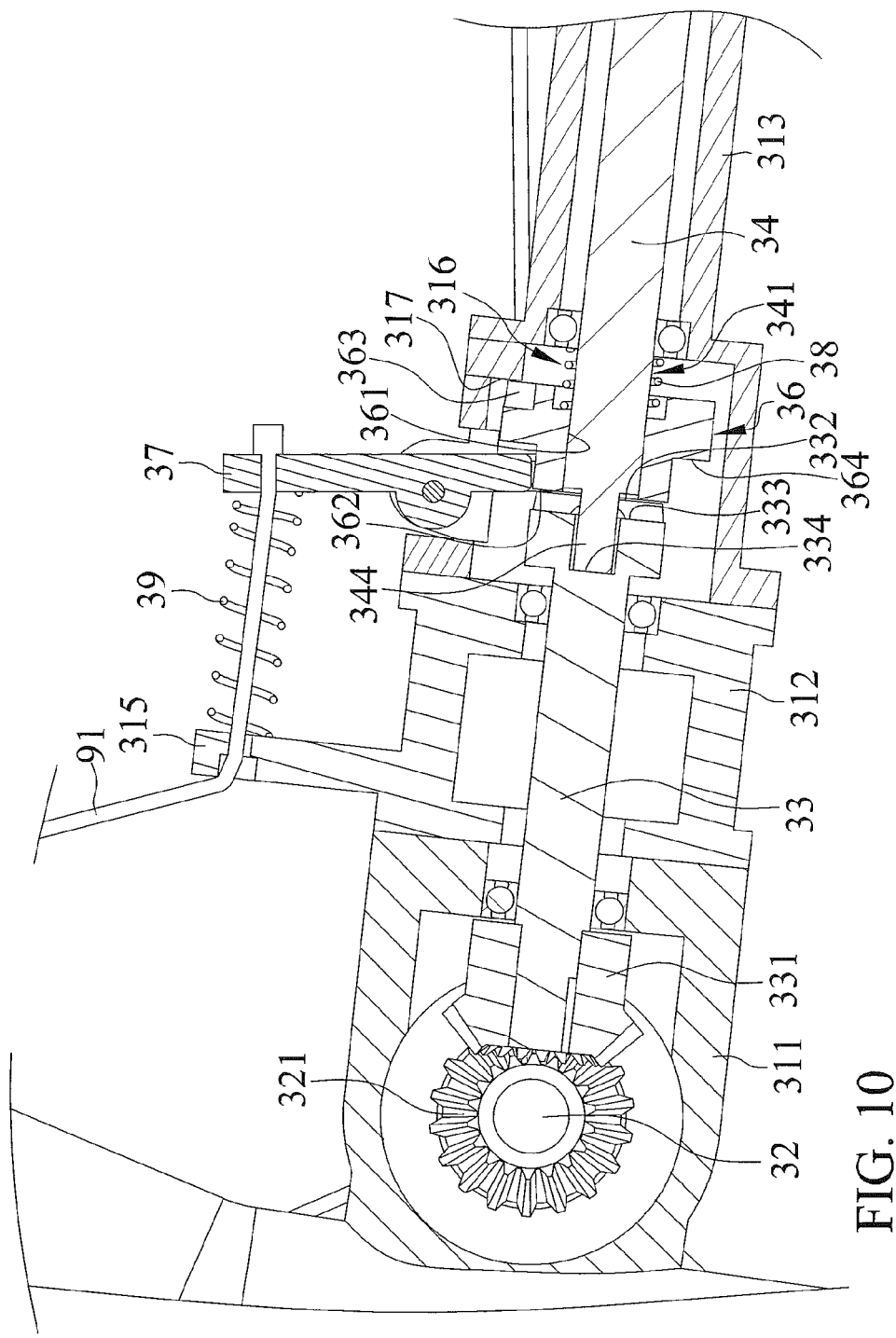
FIG. 10 is a view similar to FIG. 5, with the sliding member in a release position.
Figure 11:
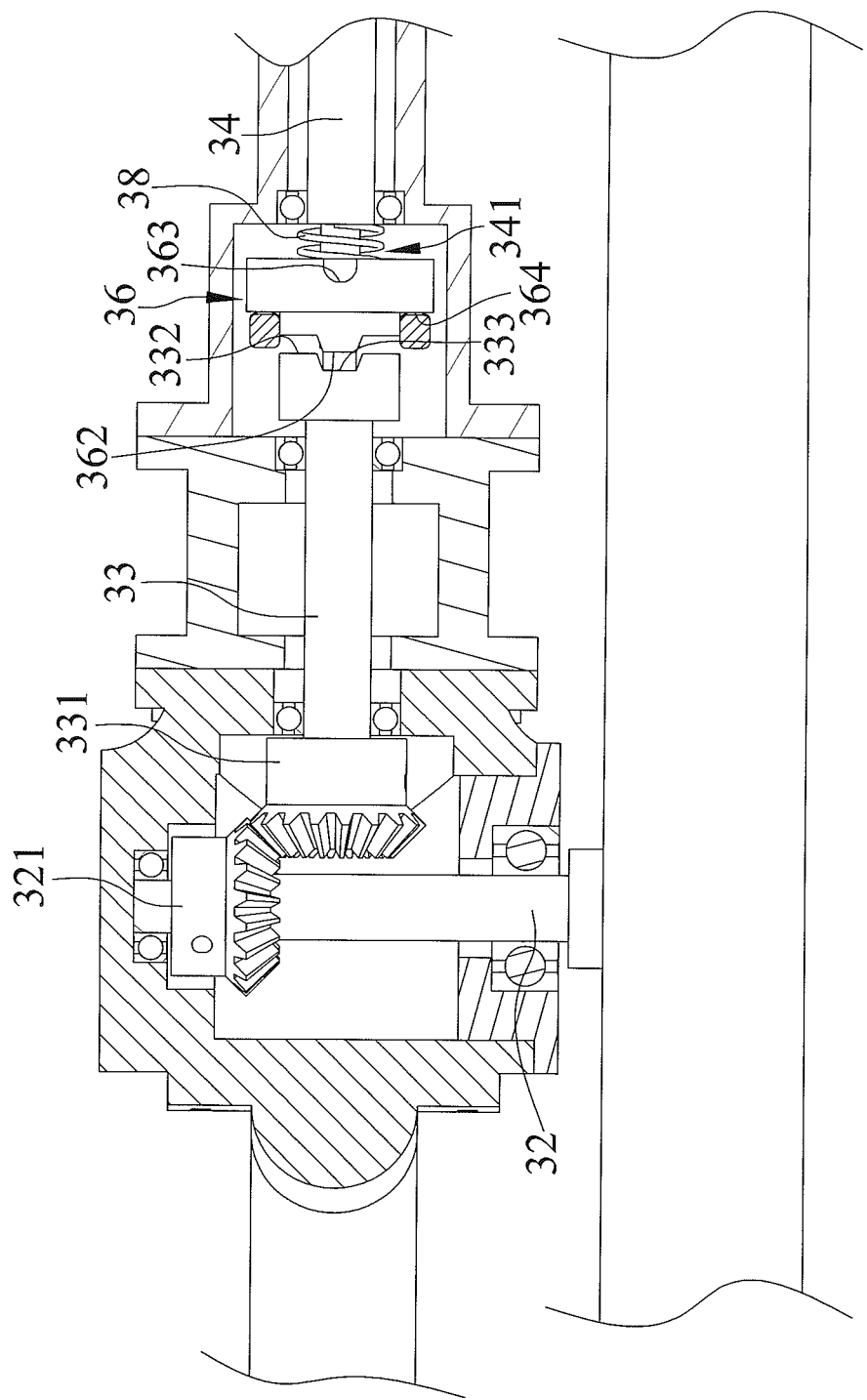
FIG. 11 is a view similar to FIG. 6, with the sliding member in a release position.

FIGS. 10 and 11 show the sliding member 36 in the release position. The second engaging portion of the sliding member 36 disengages from the first engaging portion 333, such that the first transmission shaft 33 cannot drive the sliding member 36 to rotate. The second transmission shaft 34 rotates freely relative to the housing 31. In this case, when the care taker pushes the chair 20, the footrests 23 do not move together with the rear wheels 22 and can sway freely relative to the chair 20.

Figure 12:
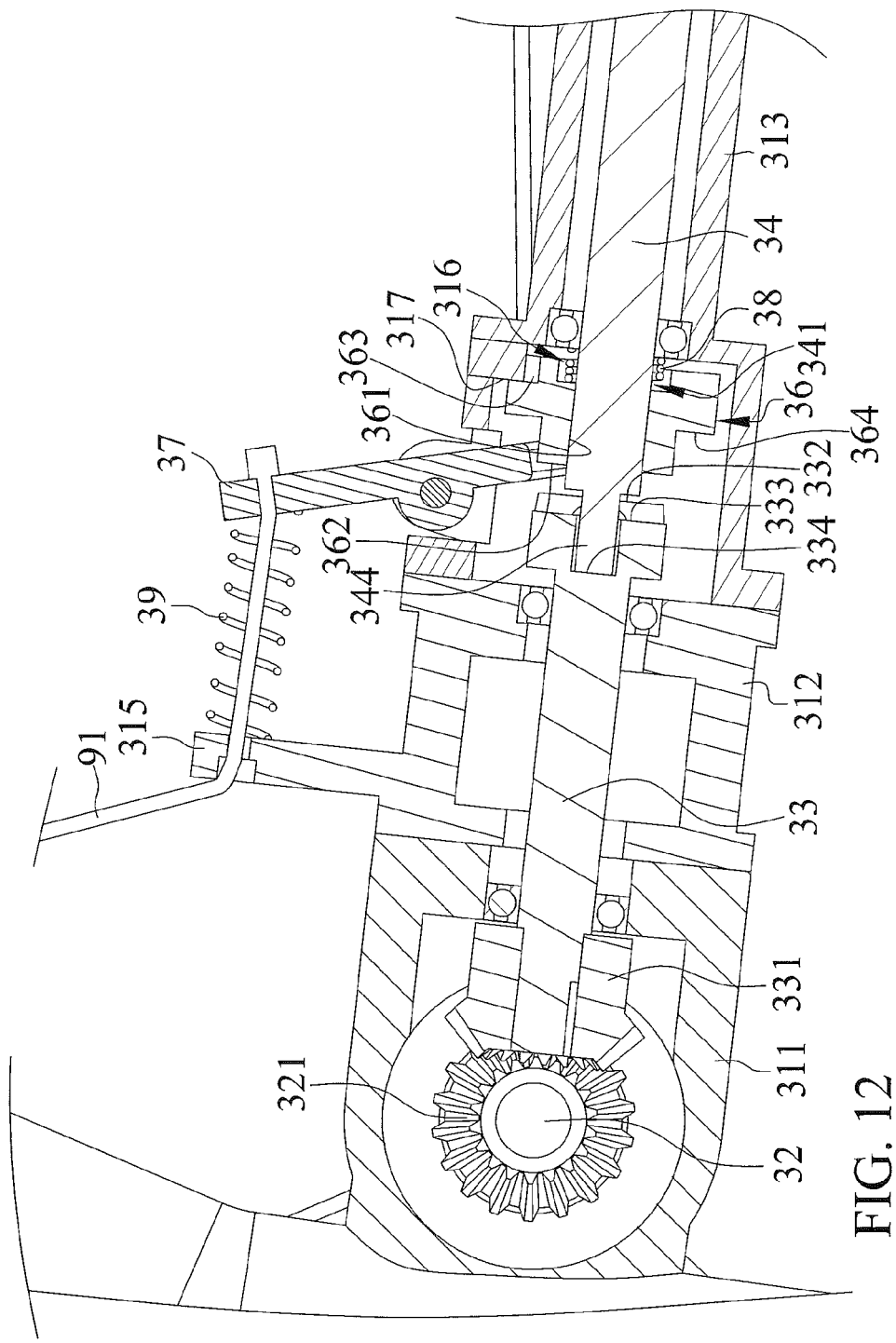
FIG. 12 is a view similar to FIG. 10, with the sliding member in a locking position.
Figure 13:
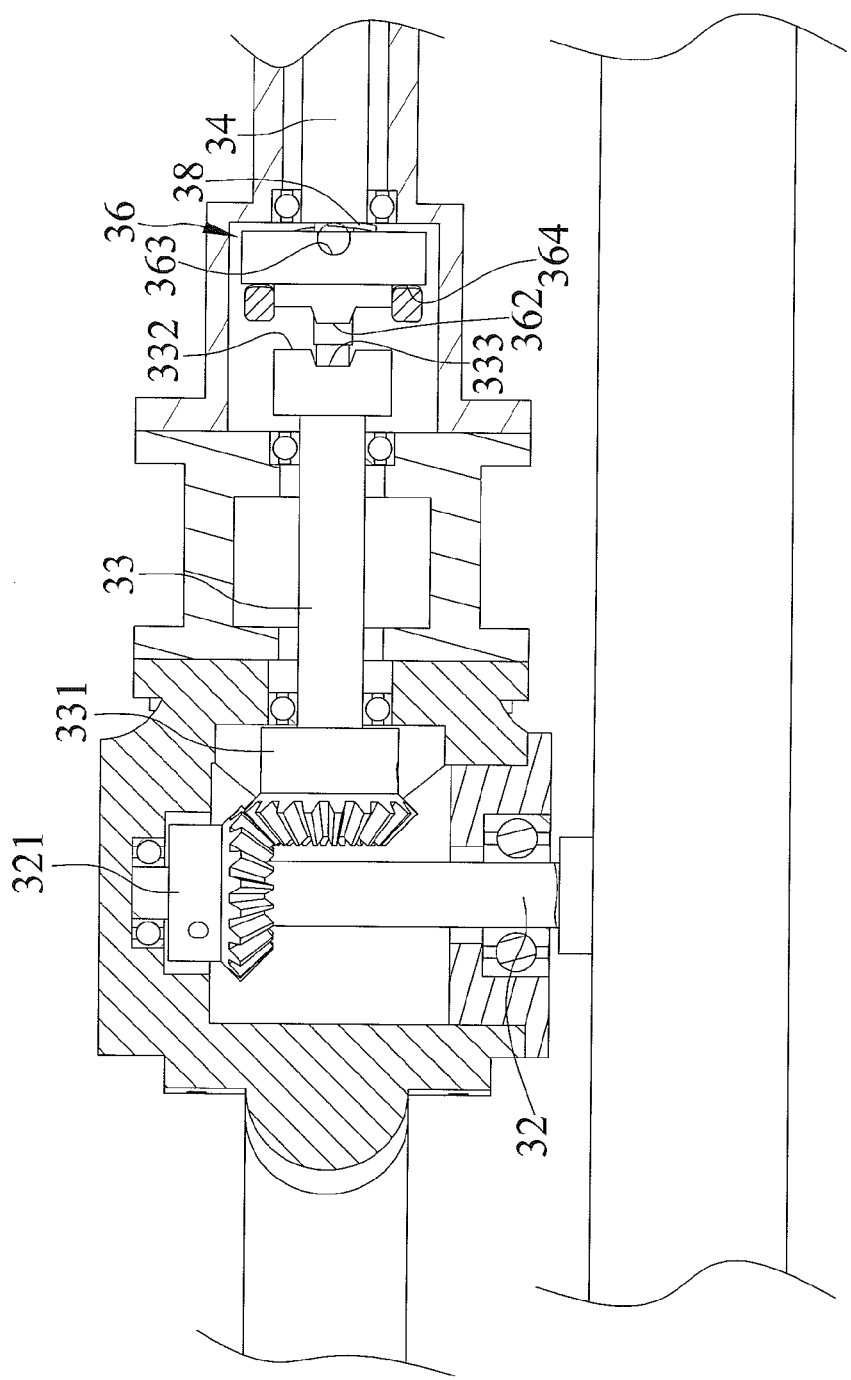
FIG. 13 is a view similar to FIG. 11, with the sliding member in the locking position.

FIGS. 12 and 13 show the sliding member 36 in the locking position. The engaging protrusion 317 of the housing 31 engages with the engaging groove 363 of the sliding member 36, such that the second transmission shaft 34 cannot rotate relative to the housing 31. In this case, when the care taker pushes the chair 20, the footrests 23 cannot sway relative to the chair 20.

Although specific embodiments have been illustrated and described, numerous modifications and variations are still possible without departing from the scope of the invention. The scope of the invention is limited by the accompanying claims.

The invention claimed is:

1. A wheelchair with a rehabilitation function comprising:
   a chair including a frame, two rear wheels, and two footrests, with the two rear wheels located on a rear end of the frame and respectively located on two sides of the frame in a horizontal direction, and with the two footrests located on a front end of the frame and respectively located on two sides of the frame in the horizontal direction; and
   two transmission devices connected to the frame and associated with the two rear wheels and the two footrests, with each of the two transmission devices including a housing, a driving shaft, a first transmission shaft, a second transmission shaft, a driven shaft, and a sliding member,
   with the driving shaft mounted in the housing and rotatable relative to the housing about a first axis, with the driving shaft including an end connected to one of the two rear wheels to permit synchronous rotation,
   with the first transmission shaft mounted in the housing and driven by the driving shaft to rotate relative to the housing about a second axis intersecting with the first axis, with an end of the first transmission shaft opposite to the driving shaft including a first reference face, with the first transmission shaft including a first engaging portion on the first reference face, with the first engaging portion having non-circular cross sections perpendicular to the second axis,
   with the second transmission shaft mounted in the housing and rotatable relative to the housing about the second axis, with the second transmission shaft mounted to the end of the first transmission shaft opposite to the driving shaft, with an end of the second transmission shaft adjacent to the first transmission shaft having a driving section,
   with the driven shaft mounted in the housing and driven by the second transmission shaft to rotate relative to the housing about a third axis parallel to the first axis and intersecting with the second axis, with the driven shaft having an end connected to one of the footrests to permit synchronous rotation,
   with the sliding member mounted around an outer periphery of the driving section to permit synchronous rotation, with an end of the sliding member adjacent to the first transmission shaft including a second engaging portion having non-circular cross sections perpendicular to the second axis, with the second engaging portion removably engaged with the first engaging portion, with the sliding member slideable along the second axis relative to the second transmission shaft between a transmission position and a release position,
   wherein when the sliding member is in the transmission position, the second engaging portion engages with the first engaging portion, and the first transmission shaft and the sliding member rotate synchronously, and
   wherein when the sliding member is in the release position, the second engaging portion disengages from the first engaging portion, and the sliding member is not driven when the first transmission shaft rotates.

2. The wheelchair with a rehabilitation function as claimed in claim 1, with the sliding member including an outer periphery that is stepped, with the outer periphery of the sliding member including an abutment face extending in a radial direction perpendicular to the second axis, with the abutment face facing the first transmission shaft, with each of the two transmission devices further including an operating rod having two ends and an intermediate portion between the two ends of the operating rod, with the intermediate portion of the operating rod pivotably connected to the housing, with an end of the operating rod mounted in the housing, with another end of the operating rod extending beyond the housing, with the end of the operating rod in the housing abutting the abutment face of the sliding member, with the end of the operating rod adjacent to the sliding member being U-shaped and seated on two sides of the sliding member diametrically opposite to each other.

3. The wheelchair with a rehabilitation function as claimed in claim 2, with the driving section having non-circular cross sections perpendicular to the second axis, with the driving section of the second transmission shaft not being in contact with the first transmission shaft, with the sliding member including an insertion hole extending along the second axis, with the insertion hole having non-circular cross sections perpendicular to the second axis and corresponding to the cross sections of the driving section, with the driving section inserted into the insertion hole, with the outer periphery of the driving section having two arcuate faces and two plan faces, with the two arcuate faces diametrically opposed to each other and have an equal spacing to the second axis, with each of the two plan faces connected between the two arcuate faces, with the two plan faces being opposite and parallel to each other, with the end of the first transmission shaft opposite to the driving shaft including a positioning groove, with the positioning groove located in a center of the first transmission shaft and extending towards the driving shaft along the second axis, with the positioning groove having cross sections perpendicular to the second axis, with an end of the second transmission shaft adjacent to the first transmission shaft having a positioning section, with the positioning section located in a center of the second transmission shaft and located on a side of the driving section adjacent to the first transmission shaft, with the positioning groove having circular cross sections perpendicular to the second axis, and with the positioning section of the second transmission shaft inserted into the positioning groove of the first transmission shaft.

4. The wheelchair with a rehabilitation function as claimed in claim 3, with the first engaging portion being a groove and extending from the first reference face towards the driving shaft along the second axis, with the first engaging portion extending through two sides of the first transmission shaft in a diametric direction perpendicular to the second axis, with the positioning groove located on a side of the first engaging portion adjacent to the driving shaft, with the second engaging portion being a protrusion and extending towards the first transmission shaft along the second axis, with the second engaging portion extending in a diametric direction perpendicular to the second axis to two sides of the second transmission shaft, with the housing including a first portion, a second portion, a third portion, and a fourth portion, with the second portion connected to the first portion, with the third portion connected to a side of the second portion opposite to the first portion, with a side of the third portion adjacent to the second portion including a compartment that is stepped, with the compartment having a bottom face facing the second portion, with the fourth portion connected to a side of the third portion opposite to the second portion, with the driving shaft received in the first portion of the housing, with the first transmission shaft received in the second portion of the housing, with the end of the first transmission shaft adjacent to the driving shaft received in the first portion, with the end of the first transmission shaft opposite to the driving shaft extending beyond the second portion, with the second transmission shaft received in the third portion of the housing, with the driven shaft received in the fourth portion of the housing, with the sliding member received in the compartment, with the intermediate portion of the operating rod pivotably connected to the third portion of the housing, and with one of the two ends of the operating rod received in the compartment of the housing.

5. The wheelchair with a rehabilitation function as claimed in claim 4, with the compartment including an engaging projection protruding from the bottom face, with an end of the sliding member opposite to the first transmission shaft including an engaging groove, with the engaging groove extending towards the first transmission shaft along the second axis, with the sliding member slideable between the transmission position, the release position, and a locking position, wherein when the sliding member is in the locking position, the engaging protrusion of the housing engages with the engaging groove of the sliding member, and rotation of the second transmission shaft relative to the housing is not permitted, wherein when the sliding member is in the release position, the second transmission shaft rotates freely relative to the housing, with a protrusion formed on an outer surface of the second portion of the housing, with one of the two ends of the operating rod opposite to the sliding member aligned with the protrusion, with each of the two transmission devices further including an elastic element and a spring, with the elastic element mounted around the second transmission shaft, with an end of the elastic element abutting the end of the sliding member opposite to the first transmission shaft, with another end of the elastic element abutting the housing, with the elastic element biasing the sliding member towards the first transmission shaft, with two ends of the spring abutting the protrusion and the operating rod, with a first bevel gear mounted to an end of the driving shaft opposite to the rear wheel to permit synchronous rotation, with a second bevel gear mounted to the end of the first transmission shaft adjacent to the driving shaft to permit synchronous rotation, with the second bevel gear meshed with the first bevel gear, with a third bevel gear mounted to the end of the second transmission shaft opposite to the first transmission shaft to permit synchronous rotation, with a fourth bevel gear mounted to an end of the driven shaft opposite to the footrest to permit synchronous rotation, with the fourth bevel gear meshed with the third bevel gear, with the first and second axes being perpendicular to each other, with the second and third axes being perpendicular to each other, with the first and third axes located on a same plane, with the two transmission devices located between the two rear wheels, and with the housing being a substantially Z-shaped hollow rod.

6. A transmission device for a wheelchair with a rehabilitation function, comprising:

a housing;

a driving shaft mounted in the housing and rotatable relative to the housing about a first axis;

a first transmission shaft mounted in the housing and driven by the driving shaft to rotate relative to the housing about a second axis intersecting with the first axis, with an end of the first transmission shaft opposite to the driving shaft including a first reference face, with the first transmission shaft including a first engaging portion on the first reference face, with the first engaging portion having non-circular cross sections perpendicular to the second axis;

a second transmission shaft mounted in the housing and rotatable relative to the housing about the second axis, with the second transmission shaft mounted to the end of the first transmission shaft opposite to the driving shaft, with an end of the second transmission shaft adjacent to the first transmission shaft having a driving section;

a driven shaft mounted in the housing and driven by the second transmission shaft to rotate relative to the housing about a third axis parallel to the first axis and intersecting with the second axis; and a sliding member mounted around an outer periphery of the driving section to permit synchronous rotation, with an end of the sliding member adjacent to the first transmission shaft including a second engaging portion having non-circular cross sections perpendicular to the second axis, with the second engaging portion removably engaged with the first engaging portion, with the sliding member slideable along the second axis relative to the second transmission shaft between a transmission position and a release position, wherein when the sliding member is in the transmission position, the second engaging portion engages with the first engaging portion, and the first transmission shaft and the sliding member rotate synchronously, and wherein when the sliding member is in the release position, the second engaging portion disengages from the first engaging portion, and the sliding member is not driven when the first transmission shaft rotates.

7. The transmission device for the wheelchair with a rehabilitation function as claimed in claim 6, with the sliding member including an outer periphery that is stepped, with the outer periphery of the sliding member including an abutment face extending in a radial direction perpendicular to the second axis, with the abutment face facing the first transmission shaft, with each of the two transmission devices further including an operating rod having two ends and an intermediate portion between the two ends of the operating rod, with the intermediate portion of the operating rod pivotably connected to the housing, with an end of the operating rod mounted in the housing, with another end of the operating rod extending beyond the housing, with the end of the operating rod in the housing abutting the abutment face of the sliding member, with the end of the operating rod adjacent to the sliding member being U-shaped and seated on two sides of the sliding member diametrically opposite to each other, with the driving section having non-circular cross sections perpendicular to the second axis, with the driving section of the second transmission shaft not being in contact with the first transmission shaft, with the sliding member including an insertion hole extending along the second axis, with the insertion hole having non-circular cross sections perpendicular to the second axis and corresponding to the cross sections of the driving section, and with the driving section inserted into the insertion hole.

8. The transmission device for the wheelchair with a rehabilitation function as claimed in claim 7, with the outer periphery of the driving section having two arcuate faces and two plan faces, with the two arcuate faces diametrically opposed to each other and have an equal spacing to the second axis, with each of the two plan faces connected between the two arcuate faces, with the two plan faces being opposite and parallel to each other, with the end of the first transmission shaft opposite to the driving shaft including a positioning groove, with the positioning groove located in a center of the first transmission shaft and extending towards the driving shaft along the second axis, with the positioning groove having cross sections perpendicular to the second axis, with an end of the second transmission shaft adjacent to the first transmission shaft having a positioning section, with the positioning section located in a center of the second transmission shaft and located on a side of the driving section adjacent to the first transmission shaft, with the positioning groove having circular cross sections perpendicular to the second axis, and with the positioning section of the second transmission shaft inserted into the positioning groove of the first transmission shaft, with the first engaging portion being a groove and extending from the first reference face towards the driving shaft along the second axis, with the first engaging portion extending through two sides of the first transmission shaft in a diametric direction perpendicular to the second axis, with the positioning groove located on a side of the first engaging portion adjacent to the driving shaft, with the second engaging portion being a protrusion and extending towards the first transmission shaft along the second axis, with the second engaging portion extending in a diametric direction perpendicular to the second axis to two sides of the second transmission shaft.

9. The transmission device for the wheelchair with a rehabilitation function as claimed in claim 8, with the housing including a first portion, a second portion, a third portion, and a fourth portion, with the second portion connected to the first portion, with the third portion connected to a side of the second portion opposite to the first portion, with a side of the third portion adjacent to the second portion including a compartment that is stepped, with the compartment having a bottom face facing the second portion, with the fourth portion connected to a side of the third portion opposite to the second portion, with the driving shaft received in the first portion of the housing, with the first transmission shaft received in the second portion of the housing, with the end of the first transmission shaft adjacent to the driving shaft received in the first portion, with the end of the first transmission shaft, opposite to the driving shaft extending beyond the second portion, with the second transmission shaft received in the third portion of the housing, with the driven shaft received in the fourth portion of the housing, with the sliding member received in the compartment, with the intermediate portion of the operating rod pivotably connected to the third portion of the housing, and with one of the two ends of the operating rod received in the compartment of the housing, with the compartment including an engaging projection protruding from the bottom face, with an end of the sliding member opposite to the first transmission shaft including an engaging groove, with the engaging groove extending towards the first transmission shaft along the second axis, with the sliding member slideable between the transmission position, the release position, and a locking position, wherein when the sliding member is in the locking position, the engaging protrusion of the housing engages with the engaging groove of the sliding member, and rotation of the second transmission shaft relative to the housing is not permitted, and wherein when the sliding member is in the release position, the second transmission shaft rotates freely relative to the housing.

10. The transmission device for the wheelchair with a rehabilitation function as claimed in claim 9, with a protrusion formed on an outer surface of the second portion of the housing, with one of the two ends of the operating rod opposite to the sliding member aligned with the protrusion, with each of the two transmission devices further including an elastic element and a spring, with the elastic element mounted around the second transmission shaft, with an end of the elastic element abutting the end of the sliding member opposite to the first transmission shaft, with another end of the elastic element abutting the housing, with the elastic element biasing the sliding member towards the first transmission shaft, with two ends of the spring abutting the protrusion and the operating rod, with a first bevel gear mounted to the end of the driving shaft to permit synchronous rotation, with a second bevel gear mounted to the end of the first transmission shaft adjacent to the driving shaft to permit synchronous rotation, with the second bevel gear meshed with the first bevel gear, with a third bevel gear mounted to the end of the second transmission shaft opposite to the first transmission shaft to permit synchronous rotation, with a fourth bevel gear mounted to the end of the driven shaft to permit synchronous rotation, with the fourth bevel gear meshed with the third bevel gear, with the first and second axes being perpendicular to each other, with the second and third axes being perpendicular to each other, with the first and third axes located on a same plane, and with the housing being a substantially Z-shaped hollow rod.

\* \* \* \* \*